US008694513B2

(12) United States Patent  (10) Patent No.: US 8,694,513 B2
Bottum et al.  (45) Date of Patent: Apr. 8, 2014

(54) SYSTEMS AND METHODS FOR GRAPHICAL SEARCH INTERFACE

(75) Inventors: Quinn Colton Bottum, Stillwater, MN (US); Michael Christopher Bottum, East Troy, WI (US); Paul William Bottum, Stillwater, MN (US)

(73) Assignee: Swoop Search, LLC, Stillwater, MN (US)

( * ) Notice: Subject to any disclaimer, the term of this patent is extended or adjusted under 35 U.S.C. 154(b) by 115 days.

(21) Appl. No.: 13/346,730

(22) Filed: Jan. 10, 2012

(65) Prior Publication Data

US 2013/0179453 A1  Jul. 11, 2013

(51) Int. Cl.
G06F 17/30 (2006.01)
(52) U.S. Cl.
USPC .................................. 707/748; 707/E17.084
(58) Field of Classification Search
USPC ......................................................... 707/748
See application file for complete search history.

(56) References Cited

U.S. PATENT DOCUMENTS 8,275,446 B2 * 9/2012 Vining et al. .................. 600/425
2004/0229290 A1 * 11/2004 Hellinga et al. ............... 435/7.1
2008/0243774 A1 * 10/2008 Jaspers et al. ..................... 707/3

* cited by examiner

*Primary Examiner* — Shyue Jiunn Hwa
(74) *Attorney, Agent, or Firm* — Bookoff McAndrews, PLLC

(57) ABSTRACT

Some embodiments of the present disclosure provide a graphical user interface as a means of inputting search parameters to database search engines. In some embodiments, two or three dimensional projections spatially represent relationships between search parameters, located along the periphery of the projections and search hits whose significance are represented by position relative to the center of the projection and comparative distance from each of the search parameters. As the user manipulates the overall shape of the search projection, the weighting of search parameters adjusts, reconfiguring the search. The present disclosure also provides, in some embodiments, an intuitive means of assimilating search parameter weightings based on peer or social network preferences with global search results.

19 Claims, 7 Drawing Sheets

SEARCHES RELATED TO SUMMER VACATION

SUMMER VACATION ESSAY         SUMMER VACATION DEALS
SUMMER VACATION IDEAS         SUMMER VACATION DESTINATIONS
SUMMER VACATION HISTORY       SUMMER VACATION SPOTS
SUMMER VACATION PICTURES      SUMMER VACATION MYSPACE

GOOOOOOOOGLE ▷    NEXT
1 2 3 4 5 6 7 8 9 10

ADVANCED SEARCH    SEARCH HELP    GIVE US FEEDBACK

GOOGLE HOME    ADVERTISING PROGRAMS    BUSINESS SOLUTIONS    PRIVACY

ABOUT GOOGLE

*FIG. 2*

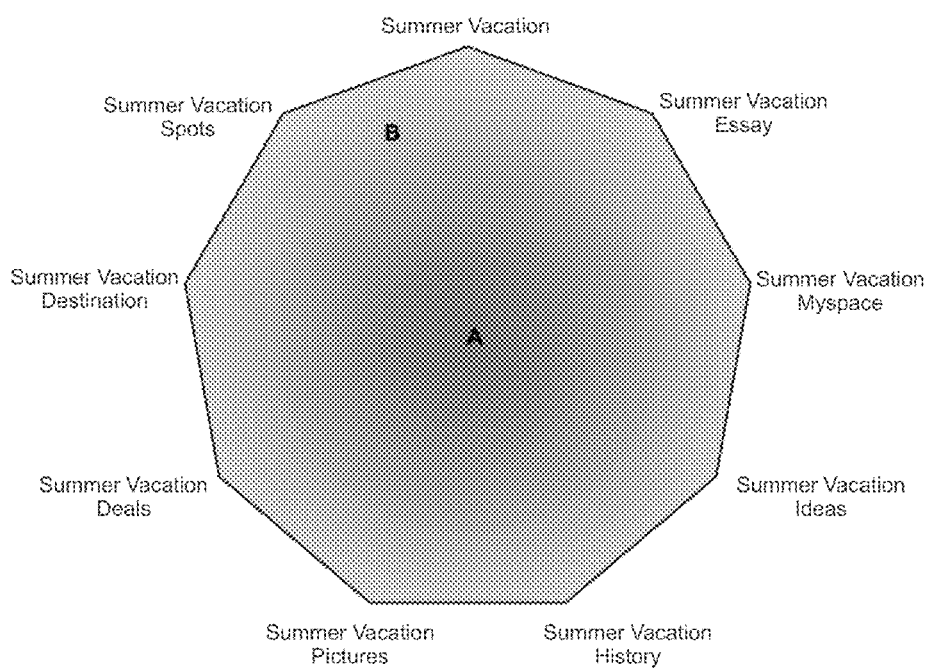
Figure 3. Representation of Hawkeye output resulting from a search for summer vacations

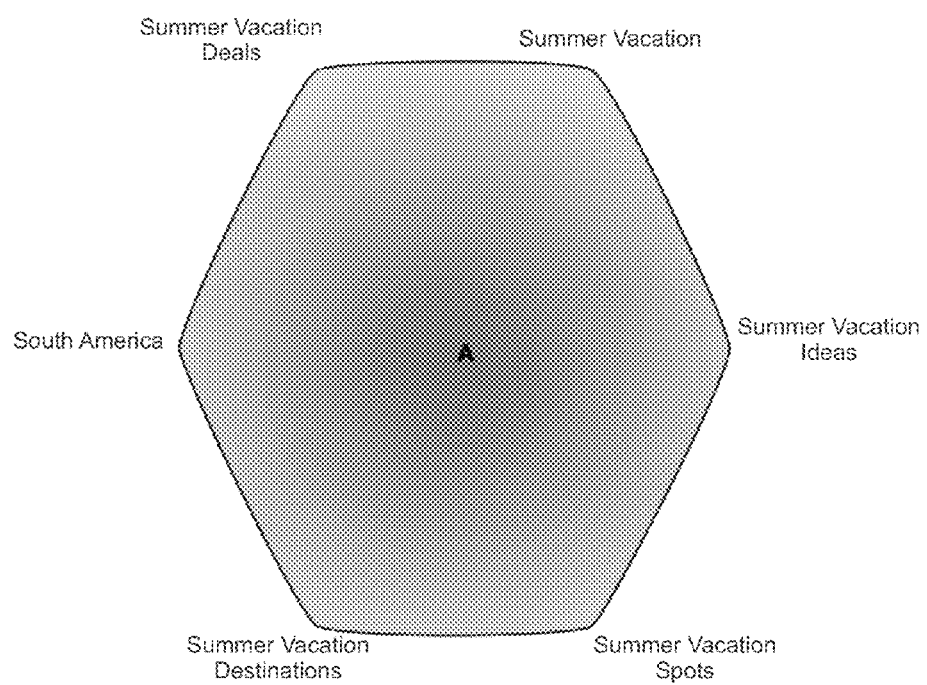
Figure 4. Hawkeye output reconfigured to reflect the elimination of parameters by user.

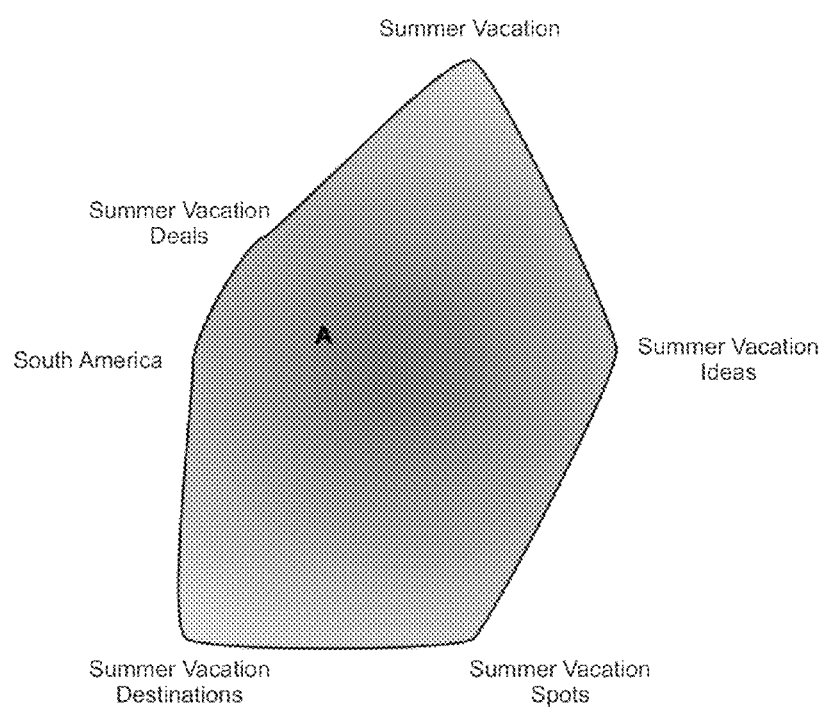
Figure 5. Hawkeye output reconfigured to reflect the greater weighting of vacation deals and South America.

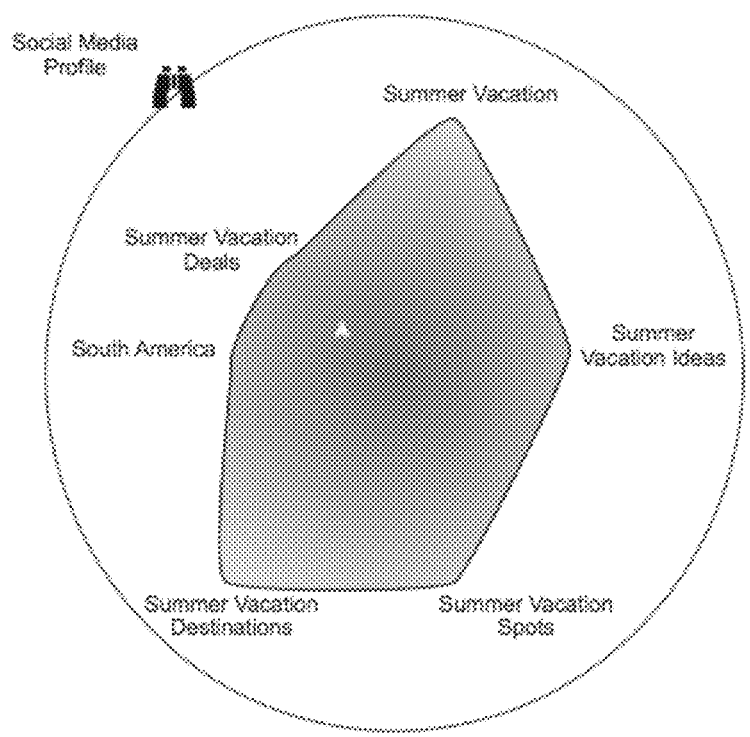
Figure 6. Hawkeye output displayed in conjunction with social media applied to the search, with the binocular symbol indicating the social media profile is being applied, and the search is being done through a 'search within' mode.

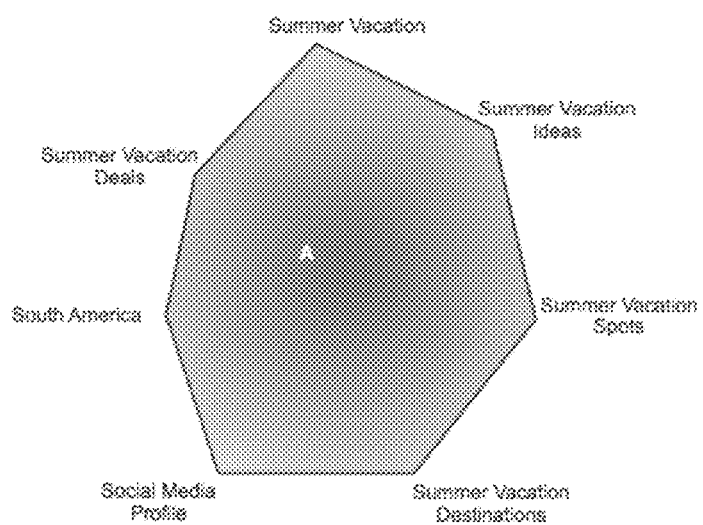
Figure 7. Hawkeye output reconfigured to display the search being done in conjunction with the social media profile applied, in the 'search beyond' mode, as the social media profile becomes an additional parameter.

SYSTEMS AND METHODS FOR GRAPHICAL SEARCH INTERFACE

FIELD OF THE INVENTION

The present disclosure is directed towards providing an intuitive means of representing and manipulating the weightings of search parameters employed by database search algorithms.

BACKGROUND

That we are awash in information is an often used, though certainly correct axiom of the early 21st century. The ubiquity of information access portals in everyday life provides the potential for connecting meaning to any experience or data set. Potential meaning is the key tenant here. How information sets are evaluated sorted and searched, remains the ultimate determinant of their actual value to the user.

Information in this modern sense may be considered as a two component entity; the first being the actual data it embodies, the second being its accessibility, based on identifying tags, anchors, or fields.

The exponential increases in both data production and storage capabilities have matched, not surprisingly, very well since "Moore's Law" tales have circulated through computational communities. Data search technologies, how information is sorted and accessed, however, have experienced a much more varied history. Though the success of market leaders' search algorithms, such as Google's "page-rank," belie their effectiveness, the increasing volume and complexity of modern information structure has lead to increased user dissatisfaction and frustration. Three significant points of current search algorithm dissatisfaction are search output discrepancies, search output bias, and an incongruous match of search interface with brain heuristic functioning.

Search output discrepancies may result from a circumstance referred to as the "local search problem." This problem arises when global data sets containing extrinsic information are not consistently cross checked or "curated" with local data sets containing intrinsic information. For example, a search for vacation destinations may yield inconsistent output if not updated with local information such as prices, business hours and patron ratings.

Search output bias may result primarily from two causes; either because of discontinuities in search parameters weightings between the user, and the search algorithm, or because of misguiding parameter weightings through "search engine optimization" practices. In either case, miscommunication or lack of clear communication between user input and search algorithm programming may skew output away from the user's intentions.

As search engine and social networking leaders battle the concept of truth and validity on the internet, a potential problem looms for society as a whole. The popularity of social networking sites has made searching within peer preference databases very effective and appealing. A search conducted within a social network database consisting of peers with similar preferences (intrinsic data) is highly likely to produce user preferable results. Such a behavior, however, limits variation by culling preference outliers. As in biology, any system lacking diversity, while successful within its native context, is resistant to change, slow to adapt, and quickly expends its resources.

Finally, search is a process to learn. Psychological studies of our mind's processing methods maintain that we interpret and organize stimuli based on heuristic schemas. These heuristic schemas contain impressions and rules of thumb that are based on our collective experiences. Commonly statistical methodologies are utilized to explain the occurrence of an activity(s), a decision(s), or a behavior(s). A common form of explanation through statistical measurement is through the use of multivariate mathematical modeling. Within the mathematical models it is very common to have 2-4 variables that explain the vast majority of the phenomenon under investigation. When we form opinions or judgments, we commonly utilize a couple of variables that form the heuristic schema that guide our decision making for a given decision topic.

To better match the processing methodology of our brain, an enhanced method and interface of search will enable a quicker, more sensitive, and more exhaustive search process. Currently, search is guided by a serial step by step process. Each step produces a list of results based on one dimension or variable guiding the search command interface. In order to match our minds' organized discovery process and experiential store of knowledge, the search interface could allow the simultaneous expression of multi-dimensional discovery or reasoning. The search process could be expressed as a coordinate within an area that is bound by the multi-dimensional vectors that represent the most important characteristics that involve the topic under investigation. Each vector is a mathematical expression denoting a combination of magnitude and direction. Based on the number of variables that are utilized to characterize the topic under investigation, the area of intersection between the vectors can range from uni-dimensional vector reflection to a multi-dimensional area of expression. We can use a coordinate within the range or area of expression to strengthen or reduce the importance of a variable under investigation. This toggling of coordinate placement allows the search process to maintain a view that simultaneously engages the critical characteristics that govern an intended inquiry.

Through this process the view of search will more closely match the heuristic management of new stimuli. It allows a more graphical representation of the multi-dimensional decision making process. It should speed the search process by maintaining a multi-dimensional view of the critical characteristics that are intended to guide the search. It may also enable a more exhaustive search due to the graphical sensitivity.

There exists an apparent need for an interface between user and search algorithms which would allow the joining of discontinuous data sets, an intuitive means of user awareness and manipulation of search parameter weightings, as well as an effective means of searching across intrinsic and extrinsic data sets.

BRIEF SUMMARY

The present disclosure provides a graphical interface between user and a database search algorithm or search engine. The interface provides the user an intuitive visualization of search parameter weighting hierarchy, as well as a means to manually reconfigure the weighting hierarchy.

The graphical interface symbolically projects the parameter weighting hierarchy as a two or three dimensional "search space," whose center represents optimal search output. The shape of the "search space" is found to have 'n' vertices representing the 'n' parameters employed in the search. The relative distances of parameter vertices to the space center represent the relative weightings or importance of each parameter in the overall search.

As a search is initiated, vertices are determined and populated either through search engine suggestions, default settings, or user definitions. Initially, all parameters are weighted equally, represented as a radially symmetric shape about the optimal search output.

The interface presents the user the capability of reconfiguring the search by dragging individual parameters toward (increasing weight), away from (decreasing weight), or completely away from (eliminating parameter) the shape center. As the shape is manipulated in this fashion, optimal search results are updated in real time.

Finally, the interface allows the user to simultaneously examine multiple data sets, searching for intersection by joining parameters common to each set, or union by joining "search spaces" of each set.

BRIEF DESCRIPTION OF THE DRAWINGS

FIG. 2 depicts one example of a typical search engine related search suggestions output;

FIG. 3 depicts an exemplary "search space" two-dimensional projection with vertices populated with search suggestion output, consistent with the presently disclosed graphical search interface;

FIG. 4 depicts an exemplary reconfigured graphical "search space" projection, consistent with the presently disclosed graphical search interface;

FIG. 5 depicts an exemplary "search space" projection weighting, e.g., vacation deals in South America, consistent with the presently disclosed graphical search interface;

FIG. 6 depicts an exemplary "search space" projection for, e.g., summer vacation with social network profile applied in 'search within' mode, consistent with the presently disclosed graphical search interface; and FIG. 7 depicts an exemplary "search space" projection for, e.g., summer vacation with social network profile applied in 'search beyond' mode, consistent with the presently disclosed graphical search interface.

DETAILED DESCRIPTION

Figure 1:
FIG. 1 depicts one example of a typical search engine output.

It should be noted from the outset that the graphical user interface consistent with the present disclosure, and as explained in this description, may be employed with any database search algorithm or search engine capable of examining multiple search parameters in determining optimal match output.

The capability of the presently disclosed graphical search interface of visualizing and reorienting search engine output as specified by the user's goals, preferences, and needs can be illustrated through using a search for 'summer vacations' as an example.

If the user was to enter the search parameter 'summer vacation' into Google's search engine, the output would be similar to the screen shot displayed in FIG. 1.

This output presents two issues that the invention addresses; one, it is impersonal in the sense that it is a generic output that does not adequately address the users goals, preferences, or needs, two, it displays the output in a list of hyperlinks potentially requiring the user to scan pages of information. In addition to these problems, the related searches that Google produces at the bottom of the initial search output page are numerous and call for extensive cross referencing of search outputs in order to determine optimal results (FIG. 2).

The presently disclosed graphical search interface would provide the following graphical output immediately after the initial search parameter was entered as represented in FIG. 3. This initial graphical output projects a radially symmetric search space shape whose vertices are populated with the initial search parameter along with all related searches that are generated (FIG. 3). Each vertex, then represents a search parameter. The maximum and minimum number of search parameters may be default or user defined. Contained within the search space shape is a matrix of hyperlinks related to all parameters. A given hyperlink's coordinates inside the search space are determined by its relevance to the search parameters. Nearer proximity represents higher relevance between hyperlink and search parameter. The middle region of the search space represents search output generated by equally weighting all search space parameters. Thus the center of the search space represents an optimal hit subset, most equally relevant to all search parameters—labeled 'A' in FIG. 3.

In order to view a hyperlink contained within the graphic, the user simply highlights the point on the graphic that is in tune with his/her goals, preferences, and needs, and the interface will display a list of hyperlinks common to that search region. If the initial search space output does match the user's intentions, the interface presents the user the capability of reconfiguring the search by dragging individual parameters toward (increasing weight), away from (decreasing weight), or completely away from (eliminating parameter) the shape center (FIG. 5). As the search space dimensions are reconfigured, its coordinate system is continually repopulated with the updated hyperlink matrix. In this way, the presently disclosed graphical search interface allows for users to intuitively perform a search in unison with their mental criteria for what a successful search will generate.

It should be noted at this point that two parameter cross-referencing search modes exist within the presently disclosed graphical search interface; quick search, and web search. In the quick search mode, only a parameter's relative radial distance to the center of the search space is compared to the radial distance of other parameters. This mode enables quicker searching since the absolute order of parameters about the search space perimeter does not factor into the overall search. In web search mode, the search weight of a parameter is determined by its radial distance to the search space center, as well as distances to all other search parameters. This mode may require reordering of parameter order, requiring additional interface time, though producing more parameter detailed output.

Additionally, the presently disclosed graphical search interface provides a means for the user to intuitively perform searches across seeming non-compatible data bases. Comparing value preferences of a user's social network database, loosely considered intrinsic data, with extrinsic data sets, such as lists of films offered through a video streaming website may be performed as follows with the presently disclosed graphical search interface. Suppose the user would wish to conduct a search looking for a film based on how his social network preferences would value each of the search space initial search parameters; say, thriller films, foreign films, and films produced before the year 2000. To engage this 'search within' protocol, the user would simply encircle the graphical search space with the user's social network icon to search for hits within the network preferences (FIG. 6), such as within social network databases such as Facebook and Google+. If, on the other hand, the user wishes to include his/her social network preferences as an additional parameter to the search space, and 'search beyond' profile preferences, he/she would simply drag the social network icon inside of the search space, allowing it to populate along the search space perimeter—currently possible only through performing multiple searches and extensive cross referencing (FIG. 7). In either search, the user's final choice would update his/her value preferences of their network profile. The intricacies of these two search strategies create significant effects on a user's social network profile and, potentially, social behavior. Choices made through the 'search within' protocol, although comfortable to the user, and predictable to the marketer, provide no new social fodder, nothing new is added to the behavioral 'gene pool' of the user. Networks of this type become quickly saturated and stale of market potential. The 'search beyond' strategy provides the appeal of including personal preferences, while potentially introducing new information and diversifying social networks. Diverse social networks are more robust, adaptable to change, and provide a greater range of investment opportunities.

The foregoing description has been presented for purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated.

The invention claimed is:

1. A computer-implemented method for enabling Internet users to interact with a graphical search interface, the method comprising:
    receiving, from a user over an electronic network, an initial search parameter;
    identifying, using a search engine database, a plurality of related search parameters, based on the received initial search parameter, wherein the search engine database enables users to query multiple data sets;
    generating, by a processor, a multi-dimensional search space, based on the initial and related search parameters, wherein the multi-dimensional search space has a perimeter defined by the initial and related search parameters;
    generating, by a processor, a matrix of hyperlinks within the multi-dimensional search space, each hyperlink having coordinates within the search space defining a relevance of each hyperlink to the initial and related search parameters;
    transmitting, for display to the user over the network, a graphical interface projecting the multi-dimensional search space, along with one or more user elements by which the user may adjust a relative weight of one or more of the initial and related search parameters by interacting with one or more of the hyperlinks; and
    transmitting, for display to the user over the network, a plurality of search results automatically updated in real time based on the user-adjusted weights of the initial and related search parameters;
    wherein each of the one or more user elements is movable toward or away from a center of the multi-dimensional search space to change the relative weight of one or more of the initial and related search parameters.

2. The method of claim 1, wherein the perimeter of the multi-dimensional search space has a plurality of vertices, each vertex of the plurality of vertices representing one of the related search parameters employed in a search initiated by the user.

3. The method of claim 1, wherein each of the one or more user elements is a vertex of a plurality of parameter vertices in the multi-dimensional search space, and relative distances of parameter vertices to a center of the multi-dimensional search space represent the relative weightings or importance of each parameter in a user Internet search.

4. The method of claim 1, wherein the multi-dimensional search space has a center representing an optimal search output.

5. The method of claim 1, wherein, initially, the initial and related search parameters are weighted equally, such that the multi-dimensional search space is a radially symmetric shape about an optimal search output.

6. The method of claim 1, further comprising:
    enabling the user to simultaneously examine multiple data sets; and
    searching for an intersection by joining parameters common to each data set, by joining search spaces of each data set.

7. The method of claim 1, wherein the hyperlinks in the matrix of hyperlinks have a relevance weighting that increases in a direction from the perimeter to a center of the multi-dimensional search space.

8. The method of claim 1, wherein any one of the plurality of related search parameters is removable as a parameter of the plurality of related search parameters by dragging a user element of the one of the plurality of related search parameters in a direction away from the perimeter of the multi-dimensional search space.

9. A computer-implemented method for enabling Internet users to interact with a graphical search interface, the method comprising:
    receiving, from a user over an electronic network, an initial search parameter;
    generating, using a search engine database a plurality of related search parameters, based on the received initial search parameter, wherein the search engine database enables users to query multiple data sets;
    generating, by a processor, a multi-dimensional search space having a plurality of vertices, based on the initial and related search parameters, wherein each vertex is populated with and represents one of the initial or related search parameters;
    generating, by a processor, a matrix of hyperlinks within the multi-dimensional search space, each hyperlink having coordinates within the search space defining a relevance of the hyperlink to each of the initial and related search parameters;
    transmitting, for display to the user over the network, a graphical interface projecting the multi-dimensional search space, along with one or more user elements by which the user may adjust a relative weight of one or more of the initial and related search parameters by interacting with one or more of the hyperlinks; and
    transmitting, for display to the user over the network, a plurality of search results automatically updated in real time based on the user-adjusted weights of the initial and related search parameters;
    wherein each of the one or more user elements is movable toward or away from a center of the multi-dimensional search space to change the relative weight of one or more of the initial and related search parameters.

10. The method of claim 9, wherein the multi-dimensional search space has 'n' vertices representing 'n' parameters employed in a search initiated by the user.

11. The method of claim 9, wherein each of the one or more user elements is a vertex of the plurality of vertices, and relative distances of vertices to a center of the multi-dimensional search space represent the relative weightings or importance of each parameter in a user Internet search.

12. The method of claim 9, wherein the multi-dimensional search space has a center representing an optimal search output.

13. The method of claim 9, wherein, initially, initial and related search parameters are weighted equally, such that the multi-dimensional search space is a radially symmetric shape about an optimal search output.

14. The method of claim 9, further comprising:
enabling the user to simultaneously examine multiple data sets; and
searching for an intersection by joining parameters common to each data set, by joining search spaces of each data set.

15. The method of claim 9, wherein the hyperlinks in the matrix of hyperlinks have a relevance weighting that increases in a direction from the perimeter to a center of the multi-dimensional search space.

16. The method of claim 9, wherein any one of the plurality of related search parameters is removable as a parameter of the plurality of related search parameters by dragging a user element of the one of the plurality of related search parameters in a direction away from the perimeter of the multi-dimensional search space.

17. A computer-implemented method for enabling Internet users to interact with a graphical search interface, the method comprising:
receiving, from a user over an electronic network, an initial search parameter;
identifying, using a search engine database, a plurality of related search parameters, based on the received initial search parameter, wherein the search engine database enables users to query multiple data sets;
generating, by a processor, a multi-dimensional search space having a perimeter defined by the initial and related search parameters;
generating, by a processor, a matrix of hyperlinks within the multi-dimensional search space, each hyperlink within the search space having a relevance to the initial and related search parameters;
transmitting, for display to the user over the network, a graphical interface projecting the multi-dimensional search space, along with one or more user elements by which the user may adjust a relative weight of one or more of the initial and related search parameters; and
transmitting, for display to the user over the network, a plurality of search results automatically updated in real time based on the user-adjusted weights of the initial and related search parameters;
wherein each of the one or more user elements is movable toward or away from a center of the multi-dimensional search space to change the relative weight of one or more of the initial and related search parameters.

18. The method of claim 17, wherein the multi-dimensional search space includes a matrix of hyperlinks having a relevance weighting that increases in a direction from the perimeter to a center of the multi-dimensional search space.

19. The method of claim 17, wherein any one of the plurality of related search parameters is removable as a parameter of the plurality of related search parameters by dragging a user element of the one of the plurality of related search parameters in a direction away from the perimeter of the multi-dimensional search space.

* * * * *